July 31, 1962
D. REYNOLDS
3,046,869
FILTER TAPE COFFEE BREWER
Filed Oct. 2, 1959
4 Sheets-Sheet 1
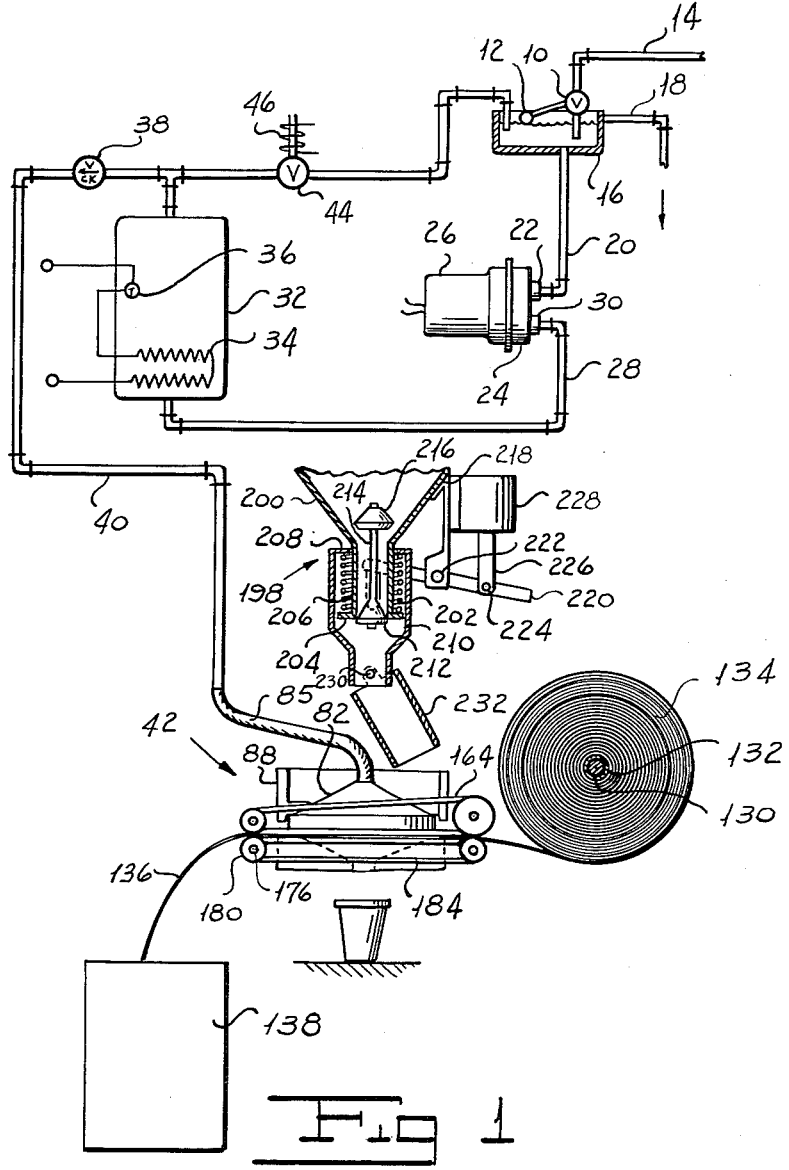
Fig. 1
INVENTOR.
DONALD REYNOLDS
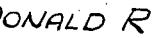
ATTORNEY

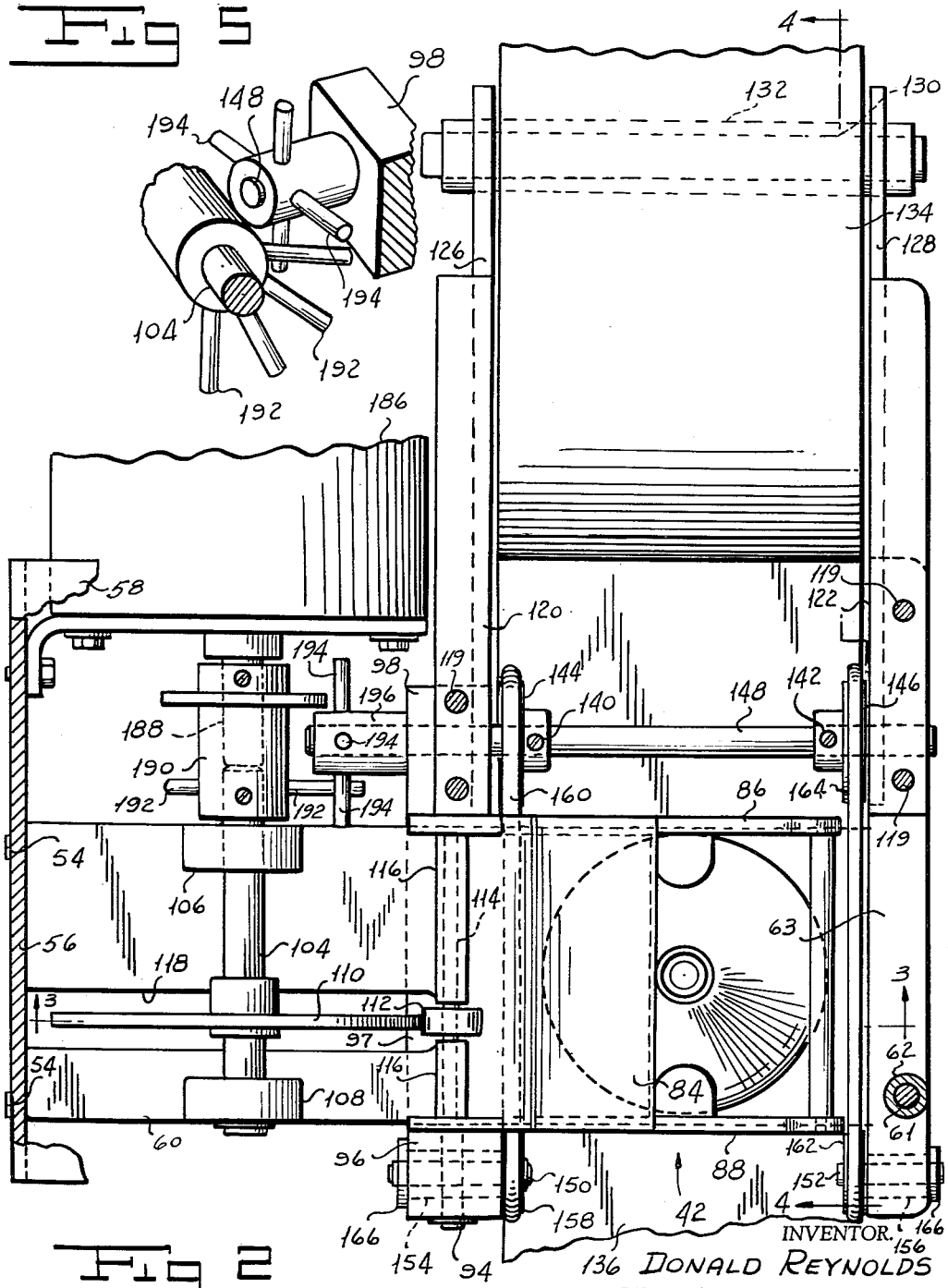

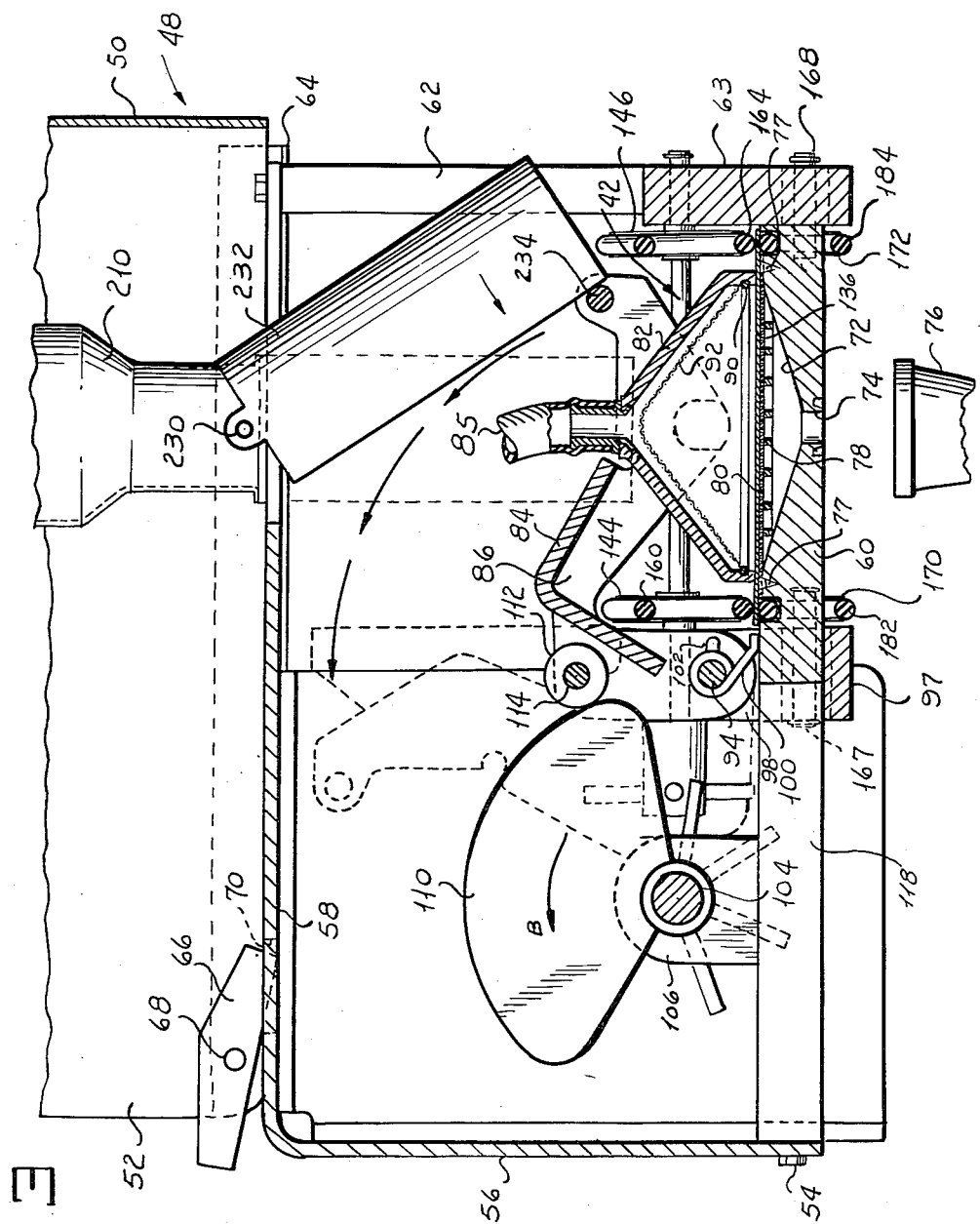

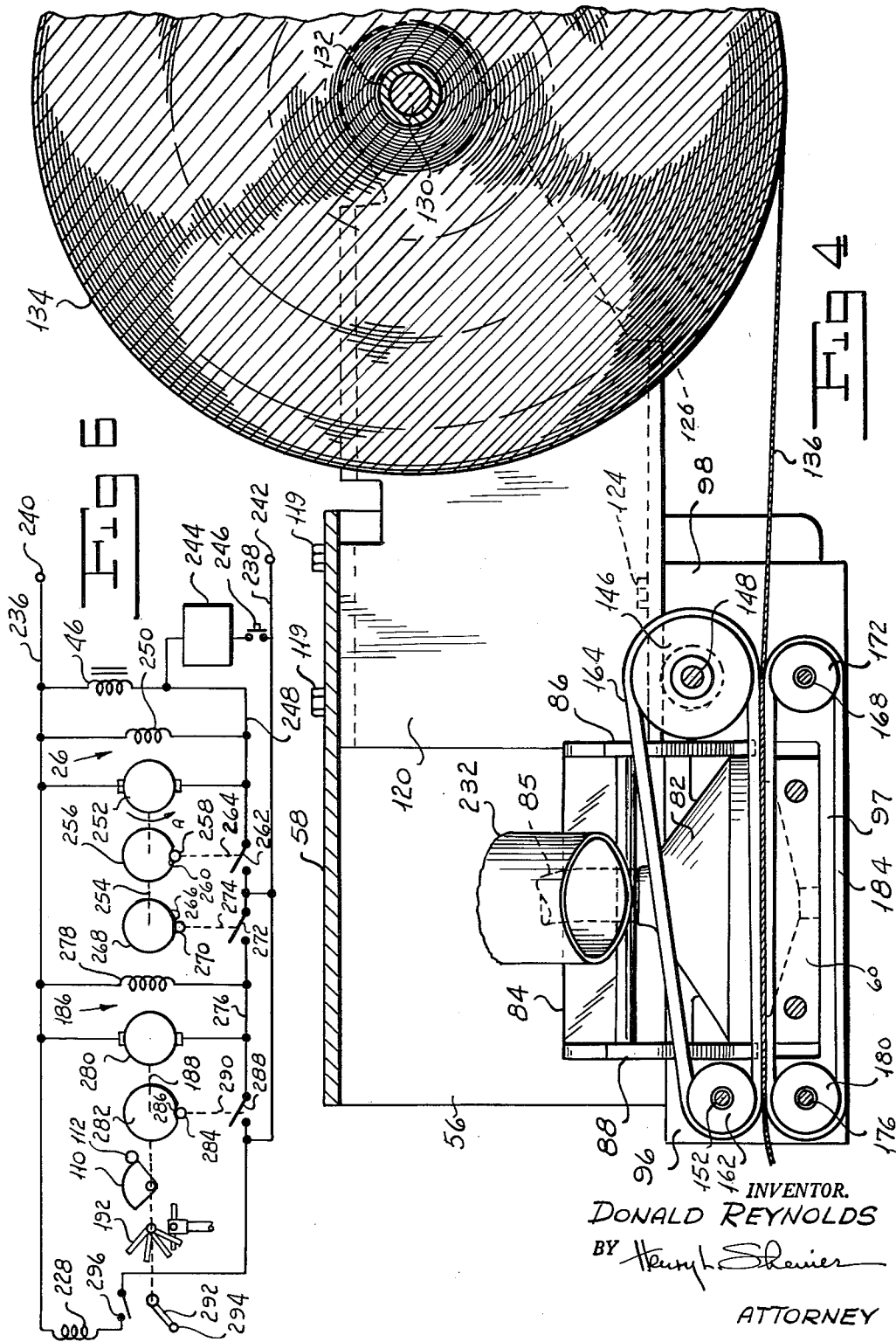

United States Patent Office 3,046,869
Patented July 31, 1962

3,046,869
FILTER TAPE COFFEE BREWER
Donald Reynolds, Wilmette, Ill., assignor to Robert Z.
Greene, Norwalk, Conn., as trustee
Filed Oct. 2, 1959, Ser. No. 844,092
10 Claims. (Cl. 99—289)

My invention relates to a filter-tape coffee brewer and more particularly to an improved coffee merchandising machine for dispensing a cup of brewed coffee which is simple and compact in construction and which overcomes the disadvantages of coffee merchandising machines of the prior art.

The usual coffee dispensing machines of the prior art mix a measured quantity of powdered coffee with a charge of hot water to produce the cup of coffee dispensed by the machine. Since powdered coffee loses the aromatic oils which gives coffee its distinctive flavor after storage for a relatively short period of time, the coffee produced by these machines is not as flavorful as is desired. For this reason and because of the clear preference of discriminating coffee drinkers for brewed coffee rather than for powdered coffee, these machines have not proved satisfactory.

Attempts have been made in the prior art to produce coffee merchandising machines which dispense coffee brewed from ground coffee. By normal methods it takes approximately three minutes to brew a satisfactory cup of coffee from fresh ground coffee. This is an excessively long period of time for the cycle of operation of an automatic merchandising machine. It has been suggested in the prior art that to obviate this problem a number of cups of coffee be brewed as a batch and that this batch be dispensed a cup at a time from a reservoir. Owing to the fact that a merchandising machine is not in continuous operation, the brewed batch of coffee must be stored for a relatively long period of time if all of the batch is to be dispensed. During storage brewed coffee quickly loses its flavor. Thus if the machine is to dispense a satisfactory cup of coffee at some time after a batch of coffee has been brewed, the brewed coffee left over from the old batch must be dumped and a fresh batch must be brewed and placed in the reservoir. This procedure results in considerable waste and in a consequent loss to the operator of the machine.

To overcome the defects of the batch brewing coffee merchandising machines of the prior art, it has been suggested that a machine be provided which dispenses a single cup of fresh coffee brewed from ground coffee on each operation of the machine by other than the conventional means. This may be accomplished in a reasonable time by the use of a relatively finely ground coffee or by the use of a large batch of ground coffee. If the grind of coffee is sufficiently fine to produce a satisfactory cup of coffee within a reasonable period of time, an excessively large amount of an unpleasant "mud" settles in the bottom of the cup containing the brewed coffee. If the grind of coffee is coarse enough to avoid the production of an excessive sediment, in order to produce a satisfactory cup of coffee within a practical length of time, such a large charge of coffee must be used so that the operation of the machine is not economical.

A further suggestion which has been advanced in the prior art is the provision of a coffee brewer having a pair of rotatable brewing cups which respectively contain a charge of fresh coffee and a charge of partially leached coffee grounds. In operation of this machine, hot water passes under the influence of gravity successively through the fresh coffee in one of the cups and through the partially leached grounds in the other of the cups to the cup provided for the consumer. After a dispensing operation the units revolve through half a revolution and the grounds which initially were partially leached are replaced by fresh coffee. This machine is relatively complicated and cumbersome for the result produced by the machine. Since the hot water passes through the coffee under the influence of gravity, the cycle time of the machine still is relatively long. Further since this machine uses a relatively fine grind of coffee, a "mud" forms in the cup of coffee dispensed. Further, a relatively large amount of coffee is consumed on each operation of this machine.

I have invented a filter-tape coffee brewer which overcomes the disadvantages of coffee dispensing machines of the prior art pointed out hereinabove. Upon each operation my brewer brews a cupful of fresh coffee from ground coffee and dispenses the coffee within a reasonable period of time to permit its incorporation in an automatic coffee merchandising machine. My brewer dispenses a cup of coffee which does not contain an excessive sediment such as is present in cups of coffee dispensed by machines of the prior art. My machine does not require an excessive amount of fresh coffee on each operation. My machine is very simple and compact in construction for the result achieved by the machine.

One object of my invention is to provide a filter-tape coffee brewer which upon each operation brews a cupful of fresh coffee from ground coffee and dispenses the coffee within time sufficiently short to permit its incorporation in an automatic merchandising machine.

Another object of my invention is to provide a filter-tape coffee brewer which brews a cup of coffee without producing an excessive sediment in the coffee being dispensed.

A further object of my invention is to provide a filter-tape coffee brewer which is extremely simple and compact in construction for the result achieved by the brewer.

Other and further objects of my invention will appear from the following description.

In general my invention contemplates the provision of a filter-tape coffee brewer including a single brewing chamber having a base and a cover adapted to move from an open position to a closed position over the base. With the cover open a measured charge of ground coffee is deposited on a length of filter paper tape fed from a roll to a position over the base. With the cover closed on the base in response to operation of the brewer, a charge of hot water under pressure passes through the chamber to the customer's cup. When a cup of coffee has thus been dispensed, the brewer is actuated to place a fresh charge of ground coffee on a new length of tape to prepare the machine for its next operation.

In the accompanying drawings which form part of the instant specification and which are to be read in conjunction therewith and in which like reference numerals are used to indicate like parts in the various views:

FIGURE 1 is a schematic view showing the relative position of the various parts of my filter-tape coffee brewer.

FIGURE 2 is a top plan view of my filter-tape coffee brewer with parts removed.

FIGURE 3 is a sectional view of my filter-tape coffee brewer taken along the line 3—3 of FIGURE 2.

FIGURE 4 is a sectional view of my filter-tape coffee brewer taken along the line 4—4 of FIGURE 2.

FIGURE 5 is a fragmentary perspective view of the tape driving mechanism of my filter-tape coffee brewer.

FIGURE 6 is a schematic view of one form of electrical circuit which may be used to control the operation of my filter-tape coffee brewer.

Referring now to FIGURE 1 of the drawings, a valve 10 controlled by a float 12 is adapted to connect a water supply pipe 14 to a reservoir 16. As is known in the art, float 12 opens the valve 10 as long as the supply of water in the reservoir 16 is below a predetermined level. If desired, the reservoir 16 may be provided with an overflow pipe 18. A pipe 20 connects the reservoir 16 to the inlet valve 22 of a positive displacement pump 24 operated by a motor 26. A pipe 28 connects the outlet valve 30 of the pump 24 to a hot water tank 32 provided with a heating element 34 controlled by a thermostatic switch 36. A check valve 38 connects the outlet of tank 32 to a pipe 40 leading to the brewing chamber indicated generally by the reference character 42 of my brewer. A normally open valve 44 controlled by a solenoid winding 46 permits vapor to escape from the tank 32 to the reservoir 16.

Referring now more particularly to FIGURES 1 to 4 of the drawings, my brewer includes a generally U-shaped frame indicated generally by the reference character 48 having a back 50 and sides 52, one of which is shown in FIGURE 3. The frame 48 may be mounted within any suitable merchandising machine cabinet (not shown) known to the art. For purposes of clarity and to avoid confusion in the drawings, I have shown in FIGURE 3 only one of the sides 52 and the structure to be described in detail hereinafter associated with this side. It will readily be understood by those skilled in the art that the structure of the other side 52 corresponds to that shown in the drawings. I employ any suitable means such, for example, as screws 54 for securing a vertical plate 56 to a base 60. I provide the vertical plate 56 with a horizontally extending plate 58. A bolt 61 surrounded by a spacer 62 is secured to the plate 58 adjacent the right end, as viewed in FIGURE 3, and is threaded into or otherwise secured to an upright bracket 63 secured to base 60. The base 60, plates 56 and 58, together with bracket 63, and the spacer 62 form the support framework for the brewing chamber mechanism, to be described hereinafter, of my brewer. I secure respective guide tracks 64 to each of the side walls 52 by any suitable means such as by welding or the like. I assemble the brewing chamber mechanism on the frame 48 by sliding the outboard edges of the plate 58 along the tracks 64. Respective latches 66 carried by pins 68 on the walls 52 are adapted to engage in notches or slots 70 in plate 58 when the brewing chamber assembly is in position on the tracks 64. The brewing mechanism may readily be removed from the frame merely by pivoting the latches 66 out of engagement with the notches 70.

I form the base 60 with a recess 72 having a central outlet opening 74 leading to the cup 76 into which coffee is dispensed. I employ any suitable means known to the art, such, for example, as screws 77 or the like, for securing a grill 78 over the recess 72. These screws 77 also retain a thin, finely perforated sheet 80 in position over the grill 78.

As shown in FIGURES 3 and 4, the brewing chamber 42 includes a top 82 carried by or integrally formed with a pair of respective arms 86 and 88 connected by a crosspiece 84. A length of flexible hose 85 connects pipe 40 to the inlet of top 82. It will be seen that the arms 86 and 88 and the cross-piece 84 form a frame which carries the top 82. I employ any suitable means such, for example, as a snap ring 90 for retaining a wire mesh 92 in position within the top 82. It will readily be understood that I may, if desired, provide the lower periheral edge of the top 82 with a sealing ring or gasket (not shown) of any suitable type known in the art for sealing the space enclosed by the chamber.

I pivotally mount the frame including arms 86 and 88 on a shaft 94 carried by supports 96 and 98 formed on a member 97 welded or otherwise secured to the base 60. One end of a spring 100 bears against the plate 60. I dispose the other end of the spring in a hole 102 formed in the arm 86, for example. Spring 100 normally tends to uncoil to move the top 82 and its supporting frame to the broken line position shown in FIGURE 3. A shaft 104 rotatably supported in bearings 106 and 108 on the base 60 carries for rotation therewith a cam 110 adapted to engage a follower roller 112 rotatably carried by a shaft 114 supported by the arms 86 and 88. Spacers 116 position the follower 112 at a location along shaft 114 at which it can be acted upon by the cam 110. In the normal position of the parts during a dispensing operation to be described hereinafter, cam 110 engages follower roller 112 to hold the top 82 closed on the base 60 over the recess 72. Upon rotation of shaft 104 cam 110 moves away from the follower 112 and spring 100 moves top 82 to its open position. A slot 118 formed in the base 60 permits this movement of cam 110.

As shown in FIGURES 3 and 4, I employ any suitable means such as bolts 119 for securing spaced brackets 120 and 122 to the underside of the plate 58. I employ bolts or the like 124 for securing the brackets 120 and 122 respectively to the bracket 98 and to the bracket 63. Brackets 120 and 122 have respective extensions 126 and 128 carrying a shaft 130 which receives a tube 132 carrying a roll 134 of filter paper tape. A length 136 of tape from the roll extends through the brewing chamber 42 between the top 82 and the base 60 to a waste receptacle 138. If desired, I could space the base 60 having recess 72 away from the grate 78 to permit the brewed coffee to flow into the cup 76 by gravity. As will be apparent from the description given hereinafter in the form of my brewer in which the base 60 carries the grate 78, hot water is forced under pressure through the chamber in the course of a brewing operation.

Any convenient means such as set screws 140 and 142 secure respective pulleys 144 and 146 to a shaft 148 rotatably carried by brackets 98 and 63. I rotatably mount respective stub shafts 150 and 152 in eccentric bushings 154 and 156 in bracket 96 and in bracket 63. The pulley 144 and a pulley 158 carried by shaft 150 for rotation therewith receive a friction drive belt 160 which may be formed of any suitable material such as rubber cord belting. The pulley 146 and a pulley 162 carried by shaft 152 for rotation therewith receive a second friction drive belt 164. As shown in FIGURE 2, nuts 166 on the eccentrics 154 and 156 provide means by which the position of the eccentrics may be changed to vary the tension on the belts 160 and 164.

Referring to FIGURES 2 to 4, shafts 167 and 168 rotatably carried by the bracket 98 and by the support 63 have respective pulleys 170 and 172 mounted thereon for rotation therewith. Respective shafts 176 rotatably carried by the bracket 96 and rotatably mounted on bracket 63 carry the respective pulleys 180. The pulley 170 and one of the pulleys 180 carry a friction drive belt 182 which cooperates with the belt 160. Pulley 172 and the other pulley 180 carry a friction drive belt 184 which cooperates with the belt 164. From the structure just described it will be apparent that when shaft 148 is driven in a manner to be described hereinafter, a length 136 of filter paper is drawn from the roll 134 and is advanced through the chamber 42.

Referring now to FIGURES 2 and 5, a motor 186 is adapted to be energized to drive its shaft 188 to drive a coupling 190 secured to the shaft. Coupling 190 carries a plurality of radially extending fingers 192 which occupy a predetermined segment on the coupling 190. Upon rotation of the shaft 188 fingers 192 engage a plurality of radially extending fingers 194 carried by a hub 196 secured to shaft 148 for rotation therewith. Thus when shaft 188 is driven, it drives shaft 148 through the medium of the fingers 192 and 194. Coupling 190 is also secured to shaft 104 for rotation therewith to provide a driving connection between shaft 188 and shaft 104.

Referring now to FIGURES 1 and 3, my brewer includes a device indicated generally by the reference character 198 for dispensing a measured amount of ground coffee from a hopper 200 supported on the frame 48 by any suitable means (not shown) known to the art. A spring 202 extending between a flange 204 formed on the end of a discharge tube 206 on the hopper 200 and a flange 208 formed on the top of a sleeve 210 normally urges the sleeve to its uppermost position as viewed in FIGURE 1. Sleeve 210 carries for movement therewith on a bracket 213 secured to sleeve 210 a valve 212 which normally is seated in the end of the discharge tube 206 under the action of spring 202. A rod 214 connects valve 212 to a valve 216 adapted to seat in the bottom of hopper 200 when sleeve 210 moves downwardly against the action of the spring 202 in a manner to be described.

A bracket 218 carried by the hopper 200 pivotally supports a lever 220 on a pin 222. I connect one end of lever 220 to the sleeve 210. A pin 224 pivotally connects the other end of lever 220 to the armature 226 of a solenoid 228 secured to the bracket 218. It will be apparent from the structure just described that with the parts of the dispenser 198 in the position shown in FIGURE 1, ground coffee from the hopper passes downwardly into the tube 206. When solenoid 228 is energized, it moves armature 226 upwardly, as viewed in FIGURE 1, to move sleeve 210 downwardly against the action of spring 202 to permit a measured amount of coffee to pass out of the outlet tube 206 and at the same time to seat valve 216 in the bottom of hopper 200 to prevent ground coffee from passing from the hopper into the outlet 206. In this manner a measured amount of ground coffee is dispensed from the hopper 200 on each energization of solenoid 228. Pins 230 on the sleeve 210 swingably support a tube 232 for movement from an inoperative position to a position at which it forms an axially aligned extension of the sleeve 210. A bar 234 extending between the arms 86 and 88 engages the lower end of the sleeve 232 to move the sleeve to a position at which its axis is at an acute angle with respect to the axis of sleeve 210 when the top is closed. When the top 82 opens, sleeve 232 moves to a position at which its axis is coincident with that of sleeve 210 to permit a charge of coffee dispensed from hopper 200 to be directed to the length 136 of tape overlying the recess 72.

Referring now to FIGURE 6 of the drawings, one form of electrical circuit which may be employed to control the operation of my brewer includes respective conductors 236 and 238 connected to the terminals 240 and 242 of a suitable source of electrical energy. I connect a coin mechanism 244 of any suitable type known to the art in series with a push-button switch 246 between conductor 238 and a conductor 248. I connect the winding 46 associated with valve 44, the field winding 250 and the armature 252 of pump motor 26 in parallel between conductor 248 and conductor 236. In response to the deposit of a predetermined sum in coins in the mechanism 244 to complete a circuit through this mechanism and upon the actuation of switch 246, a circuit is complete for winding 46, field winding 250, and armature 252. Motor 26 drives a shaft, indicated schematically at 254 in FIGURE 6, which carries a full cycle cam 256 for rotation therewith. As the motor begins to rotate, cam 256 drives a follower 258 out of the cam recess 260 to close a normally open switch 262 through a linkage 264. I connect switch 262 between conductor 248 and conductor 238 to complete a holding circuit for motor 26 and for winding 46 when the switch closes. As the motor completes a revolution, follower 258 drops into recess 260 to interrupt the motor holding circuit and thus stop the flow of water.

As motor 26 approaches the end of a revolution in the direction of the arrow "A" in FIGURE 6, a projection 266 on a cam 268 carried by shaft 254 actuates a follower 270 to close a normally open switch 272 by means of a linkage 274. I connect switch 272 between conductor 238 and a conductor 276. I connect the field winding 278 and the armature 280 of motor 186 in parallel between conductor 276 and conductor 236. Shaft 188 of motor 186 carries for rotation therewith a full cycle cam 282 which, as the motor begins to rotate, drives its follower 284 out of the cam recess 286 to close a normally open switch 288 through a linkage 290. I connect switch 288 between conductor 276 and conductor 238 to complete a holding circuit for motor 186 when the switch closes. As motor 186 completes a revolution, follower 284 drops into recess 286 to permit switch 288 to open to interrupt the motor holding circuit.

For purposes of clarity I have indicated the cam 110 and the fingers 192 schematically on shaft 188 in FIGURE 6. Shaft 188 also carries for rotation therewith an arm 292 carrying a roller 294 adapted to close a normally open switch 296 at a predetermined point in the course of a revolution of shaft 188. It will be understood that, if desired, roller 294 could be mounted on cam 110 to operate a suitably located switch carried by the plate 56 or by the plate 58. I connect switch 296 in series with winding 228 between conductors 236 and 238. Thus when roller 294 closes switch 296, winding 228 is momentarily energized to dispense a measured amount of ground coffee from the device 198.

In operation of my filter-tape coffee brewer in its normal condition before a dispensing operation is initiated, a fresh length 136 of filter paper carrying a charge of fresh ground coffee is disposed over the recess 72 and the cam 110 is in engagement with follower 112 to close cover 82 on the base 60. When after having deposited a sum in coins equal to the price of a cup of coffee in the register 244, the customer actuates switch 246, solenoid winding 46 is energized to close the valve 44, and motor 26 is energized. It will be understood that cam 256 completes a holding circuit for these devices for a single revolution of the motor 26. Motor 26 drives pump 24 to draw a charge of water from the reservoir 16 and to force this charge into the tank 32. As a result of this action a charge of hot water is forced out of the tank and through check valve 38 to the pipe 40 and from the pipe through the brewing chamber 42 to the cup 76 as a cup of fresh brewed ground coffee. Owing to the fact that I employ positive pressure to force the charge of water through the ground coffee, the brewing time is relatively short. Furthermore, my use of filter paper permits my brewer to use a relatively fine grind of coffee without forming an excessive sediment in the cup of coffee being dispensed.

As the motor 26 completes a revolution, projection 266 engages the follower 270 to close switch 272 to energize motor 186. As has been explained hereinabove, cam 282 completes a holding circuit for the motor to insure a complete revolution. As the motor rotates, it drives shaft 104 in the direction of the arrow "B" in FIGURE 3. In the course of the initial portion of rotation of the shaft, cam 110 leaves follower 112 and spring 100 urges the top 82 to its open position shown in broken lines in FIGURE 3. Upon continued rotation of shaft 188 and the coupling 190, fingers 192 engage the fingers 194 to rotate shaft 148 through a distance sufficient to cause the friction drive belts to position a fresh length of filter paper over the recess 72. At the same time the used length of paper carrying the leached grounds passes into the waste receptacle 138. Owing to the fact that the fingers 192 occupy only a segment of the coupling 190, the tape drive stops before shaft 188 completes a revolution. As the shaft continues to rotate, pin 294 closes switch 296 to move sleeve 210 downwardly against the action of spring 202 to permit a charge of ground coffee to pass from the hopper 200 through the sleeve and through the tube 232 onto the fresh length of tape over the recess 72. It will be remembered that since the top 82 is open at this time, sleeve 232 is in a position to permit this action.

By the time a fresh charge of ground coffee has been deposited on the fresh length of tape, cam 110 again engages folower 112 to move top 82 against the action of spring 100 to its closed position illustrated in full lines in FIGURE 3. When follower 284 drops into recess 286, motor 186 stops and the operation is complete. At this time cam 110 is in condition for the next dispensing operation.

It will be seen that I have accomplished the objects of my invention. I have provided a filter tape coffee brewer which brews a cup of fresh ground coffee within a period of time short enough to permit its efficient use in an automatic merchandising machine. My brewer accomplishes this result without producing an excessive amount of sediment such as is produced in brewers of the prior art. My brewer is extremely simple and compact in construction for the desirable result produced thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not be limited to the specific details shown and described.

Having thus described my invention, what I claim is:

1. A coffee brewer including in combination a brewing chamber comprising a stationary base and a top and means mounting the top for movement from an open position to a closed position on said base, a supply of filter tape, means for moving said top to its open position, means for moving a length of tape from said supply to a position over said base and for positioning said length of tape from said supply over said base, a container for holding a supply of coffee, means for depositing a charge of coffee from said supply on said length of tape, means for closing said top following the positioning of said length of tape and the deposit of said charge of coffee to close said chamber, a source of hot water, and means for passing a charge of water from said source through said closed chamber.

2. A coffee brewer including in combination a supply of filtering tape, a stationary brewing chamber having an inlet port and an outlet port, said brewing chamber being adapted to receive a portion of the filtering tape from said supply, means for moving a portion of said filtering tape from said supply to a position within said chamber and for positioning said portion of filtering tape from said supply in said chamber between said inlet port and said outlet port, a container for holding a supply of coffee, means for depositing a charge of coffee from said supply on said portion of filtering tape positioned within said chamber, a source of hot water, and means for passing a charge of hot water from said source through said chamber.

3. A coffee brewing machine including in combination a supply of filtering tape, a stationary brewing chamber having an inlet port and an outlet port, said brewing chamber being adapted to receive filtering tape from said supply, means for moving a length of tape from said supply to a position within said chamber and for positioning said length of filtering tape from said supply in said chamber between said inlet port and said outlet port, a container for holding a supply of coffee, means for depositing a charge of comminuted coffee from said supply on said length of filtering tape positioned within said chamber, a source of hot water, means for passing a charge of hot water from said water source through said chamber, and means for applying superatmospheric pressure to the hot water passing to said chamber.

4. A coffee brewer including in combination a supply of filtering tape, a stationary brewing chamber having an inlet port and an outlet port, said brewing chamber being adapted to receive filtering tape from said supply, means for moving a length of filtering tape from said supply to a position within said chamber and for positioning said length of filtering tape from said supply in said chamber between said inlet port and said outlet port, a container for holding a supply of ground coffee, means for depositing a charge of coffee from said supply on said length of filtering tape positioned within said chamber, a source of hot water, means for passing a charge of hot water from said water source through said chamber, means for replacing the length of filtering tape in said chamber with a fresh length of tape from said supply after the passage of said charge of water through the chamber and means for actuating said depositing means to deposit a fresh charge of coffee on said fresh length of filtering tape.

5. A coffee brewer including in combination a supply of filtering tape, a stationary brewing chamber, a foraminous support, means for moving a portion of said filtering tape from said supply to a position between said chamber and said foraminous support and for clamping said portion of said filtering tape between said chamber and said foraminous support, means for depositing a measured amount of coffee on said tape portion, a source of hot water and means for passing a charge of hot water from said supply through said chamber.

6. A coffee brewer including in combination a supply of filtering tape, a stationary brewing chamber, a foraminous support, means for moving a portion of said filtering tape from said supply to a position between said brewing chamber and said foraminous support and for clamping said portion of said filtering tape between said chamber and said foraminous support, means for depositing a measured amount of coffee on said tape portion, a source of hot water, means for passing a charge of hot water from said source through said chamber to produce brewed coffee and means for collecting said brewed coffee.

7. A coffee brewer including in combination a brewing chamber comprising a stationary base and means mounting the top for movement from an open position to a closed position on said base, a supply of filter tape, means for moving said top to its open position, means for feeding tape from said supply to a position over said base, means adapted to be actuated to control the operation of said brewer, means responsive to said control means for actuating said tape feeding means to position a length of tape over said base, a container for holding a supply of coffee, means for depositing a charge of coffee from said coffee supply on a length of filter tape positioned over said base, means responsive to said control means for actuating said coffee depositing means and means responsive to said control means for closing said top.

8. A coffee brewer including in combination a brewing chamber comprising a stationary base and a top and means mounting said top for movement from an open position to a closed position over said base, a supply of filter tape, a container for holding a supply of coffee, said top being closed over a length of tape positioned within said chamber with a charge of coffee on said tape before operation of said brewer, a source of hot water, means adapted to be actuated to control the operation of said brewer, means responsive to said control means for passing a charge of hot water from said water source through said chamber, means responsive to said control means for opening said top following the passage of said charge of water through said chamber, means for replacing said length of tape in said chamber with a fresh length of tape from said supply, means responsive to said control means for actuating said tape replacing means after said top moves to its open position, means for depositing a charge of coffee from said coffee supply on a length of filter tape positioned over said base, means responsive to said control means for actuating said coffee depositing means after said length of tape in said chamber has been replaced and means for closing said top after operation of said coffee depositing means to prepare said brewer for its next operation.

9. A coffee brewer including in combination a brewing chamber comprising a base and a top and means mounting the top for movement from an open position to a closed position on said base, a supply of filtering tape, means for moving said top to its open position, means for positioning a length of tape from said supply over said base, a container for holding a supply of coffee, means for depositing a charge of coffee from said supply on said length of tape, means for closing said top, a source of hot water, means for passing a charge of hot water from said source through said chamber to produce brewed coffee and to leave coffee grounds in said chamber and means for advancing said tape to carry said coffee grounds out of said chamber.

10. A coffee brewer including in combination a brewing chamber comprising a stationary base formed with a recess having an outlet port, a grill carried by said base over said recess, a perforated metal sheet disposed over said grill, a top, means mounting said top for movement from an open position to a closed position on said base, a supply of filter tape, means for moving said top to its open position, means for moving a length of said tape from said supply to a position over said perforated metal sheet and for positioning said length of tape over said perforated metal sheet, a container for holding a supply of coffee, means for depositing a charge of coffee from said supply on said length of tape, means for closing said top following the positioning of said length of tape and the deposit of said charge of coffee to close said chamber, a source of hot water and means for passing a charge of water from said source through said closed chamber.

References Cited in the file of this patent

UNITED STATES PATENTS

| | | |
|---|---|---|
| 1,467,778 | Paola | Sept. 11, 1923 |
| 1,953,289 | Cohen | Apr. 3, 1934 |
| 2,283,967 | Brown | May 26, 1942 |
| 2,392,452 | Baumann | Jan. 8, 1946 |
| 2,718,843 | Jones | Sept. 27, 1955 |
| 2,750,871 | Landgraber | June 19, 1956 |
| 2,827,845 | Richeson | Mar. 25, 1958 |
| 2,867,327 | Hirs | Jan. 6, 1959 |
| 2,931,288 | Totten | Apr. 5, 1960 |
| 2,939,380 | Parraga | June 7, 1960 |

FOREIGN PATENTS

| | | |
|---|---|---|
| 279,363 | Germany | Oct. 19, 1914 |